US011823280B2

(12) United States Patent
Kusens

(10) Patent No.: US 11,823,280 B2
(45) Date of Patent: *Nov. 21, 2023

(54) METHOD FOR DETECTING AND PREVENTING FRAUDULENT HEALTHCARE CLAIMS

(71) Applicant: PIONETECHS, INC., North Miami Beach, FL (US)

(72) Inventor: Bruce Howard Kusens, North Miami Beach, FL (US)

(73) Assignee: PIONETECHS, INC., North Miami Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/577,778

(22) Filed: Jan. 18, 2022

(65) Prior Publication Data
US 2022/0138863 A1 May 5, 2022

Related U.S. Application Data

(63) Continuation of application No. 15/994,803, filed on May 31, 2018, now Pat. No. 11,227,337, which is a continuation of application No. 13/270,255, filed on Oct. 11, 2011, now Pat. No. 10,002,391.

(60) Provisional application No. 61/391,953, filed on Oct. 11, 2010.

(51) Int. Cl.
*G06Q 40/00* (2023.01)
*G06Q 40/08* (2012.01)
(52) U.S. Cl.
CPC .................... *G06Q 40/08* (2013.01)

(58) Field of Classification Search
CPC ...................................... G06Q 40/08
See application file for complete search history.

(56) References Cited

U.S. PATENT DOCUMENTS

| 2003/0069760 | A1* | 4/2003 | Gelber | G06Q 10/10 705/2 |
| 2004/0117215 | A1* | 6/2004 | Marchosky | G16H 10/60 705/3 |
| 2007/0124238 | A1* | 5/2007 | Hogg | G06Q 30/0214 235/380 |
| 2007/0282723 | A1* | 12/2007 | Cohen | G06Q 40/00 705/35 |
| 2009/0094064 | A1* | 4/2009 | Tyler | G06Q 10/10 705/4 |

FOREIGN PATENT DOCUMENTS

CA     2712849 A1 *  2/2011  ............. G06Q 40/08

OTHER PUBLICATIONS

Wong: "Employing Artificial Intelligence to Minimize Internet Fraud", International Journal of Cyber Society and Education, pp. 61-72, vol. 2, No. 1, Jun. 2009 (Year: 2009).*

* cited by examiner

*Primary Examiner* — Edward J Baird
(74) *Attorney, Agent, or Firm* — Daniel S. Polley, P.A.

(57) ABSTRACT

A computer implement method that assist healthcare payers in identifying potentially fraudulent claims and which requests confirmation preferably from a healthcare provider or patient of services rendered by the healthcare provider or products received by the patient. Confirmation of equipment and services can occur at different times in the settlement process including, but not limited to, prior to payments being made to health care providers.

10 Claims, 2 Drawing Sheets

Health Care Claim Integrity System Detection Process

METHOD FOR DETECTING AND PREVENTING FRAUDULENT HEALTHCARE CLAIMS

This application is a continuation of U.S. application Ser. No. 15/994,803, filed May 31, 2018, which is a continuation of U.S. application Ser. No. 13/270,255, filed Oct. 11, 2011, which application claims the benefit of and priority to U.S. Provisional Patent Application Ser. No. 61/391,953, filed Oct. 11, 2010. All of the above-identified applications are incorporated by reference in their entireties for all purposes.

1. FIELD OF THE INVENTION

The present invention relates generally to healthcare claims and more particularly to a method for helping to detect and reduce fraudulent healthcare claims.

2. BACKGROUND OF THE INVENTION

In the current environment, healthcare spending accounts for over 15% of the GDP according to a 2004 General Accounting Office report to Congress. Of the funds expended for health care each year, the National Health Care Anti-fraud Association (NHCAA) estimated that at least 3% was lost to fraud. This amounts to in excess of $60 Billion lost to fraud each year.

Health Care fraud can manifest itself in a variety of ways. Providers can bill for services or equipment not provided, administering tests that are not medically necessary, administering more expensive tests and equipment (up-coding), multiple billing for services or unbundling of lab tests performed together among others. There are even instances of policy holders letting others use their health care cards to receive improper benefits as well as instances of medical identity theft that contribute to the ongoing health care fraud problem.

The present invention is directed to a novel method for helping to detect and reduce fraudulent healthcare claims.

SUMMARY OF THE INVENTION

The present invention generally describes a novel method that assist healthcare payers in identifying potentially fraudulent claims and in confirming receipt of equipment and services at different times in the settlement process including, but not limited to, prior to payments being made to health care providers. In connection with the description of the present the following definitions will be used:

Definitions

| | |
|---|---|
| Health Care Claim Integrity System | A method, process and/or system to analyze health care claims and/or remittance data for the purposes of helping in the detection of potential fraud and abuse. It additionally can include a process to verify services and supplies provided with or by the healthcareprovider and/or patient. |
| 835 | A HIPAA compliant electronic data format utilized for the purposes of remitting payments to healthcare providers for services rendered. However, this format is not considered limiting and other HIPAA or non-HIPAA compliant electronic data formats can be used and are considered within the scope of the invention. |
| 837 | A HIPAA compliant electronic data format utilized for the purposes of billing payers for healthcare services rendered to its members. However, this format is not considered limiting and other HIPAA or non-HIPAA compliant electronic data formats can be used and are considered within the scope of the invention. |
| Analytics Engine | A proprietary system designed to process 835 and/or 837 files or other file formats and determine the likelihood of potential fraud and abuse based on analytical data and rules including self "learning" algorithms. This rules engine is preferably where the determination of a likelihood of a fraudulent claim and/or abusive claim is made. Preferably, a base set of rules are provided with the system dynamically creating new rules as more data is introduced into the system. The engine can also take into account new claims information for statistical analysis, responses received from patients/providers to claim inquiries, and other data obtained through the system over time. |
| 1010 Data Warehouse | A proprietary electronic database system utilized by the Health Care Claim Integrity System to store and process health care claim data and confirmation records. Though not limiting, it is preferred that the database system be relatively large and permit the use of extremely large data sets and also that it can perform queries across these extremely large data sets almost instantly. |
| Detection Criteria | A set of rules determined through analytical analysis of data that is utilized to determine if a claim for health care service is potentially fraudulent. Criteria includes but is not limited to excessive billing amounts, higher costs per patient, excessive patients per physician, increased number of tests per patient, abnormal distance between treatment location and patient's residence and a higher rate of prescription for certain drugs. Detection Criteria also includes the creation of rules as a result of self "learned" algorithms. |

DETAILED DESCRIPTION OF THE INVENTION

Figure 1:
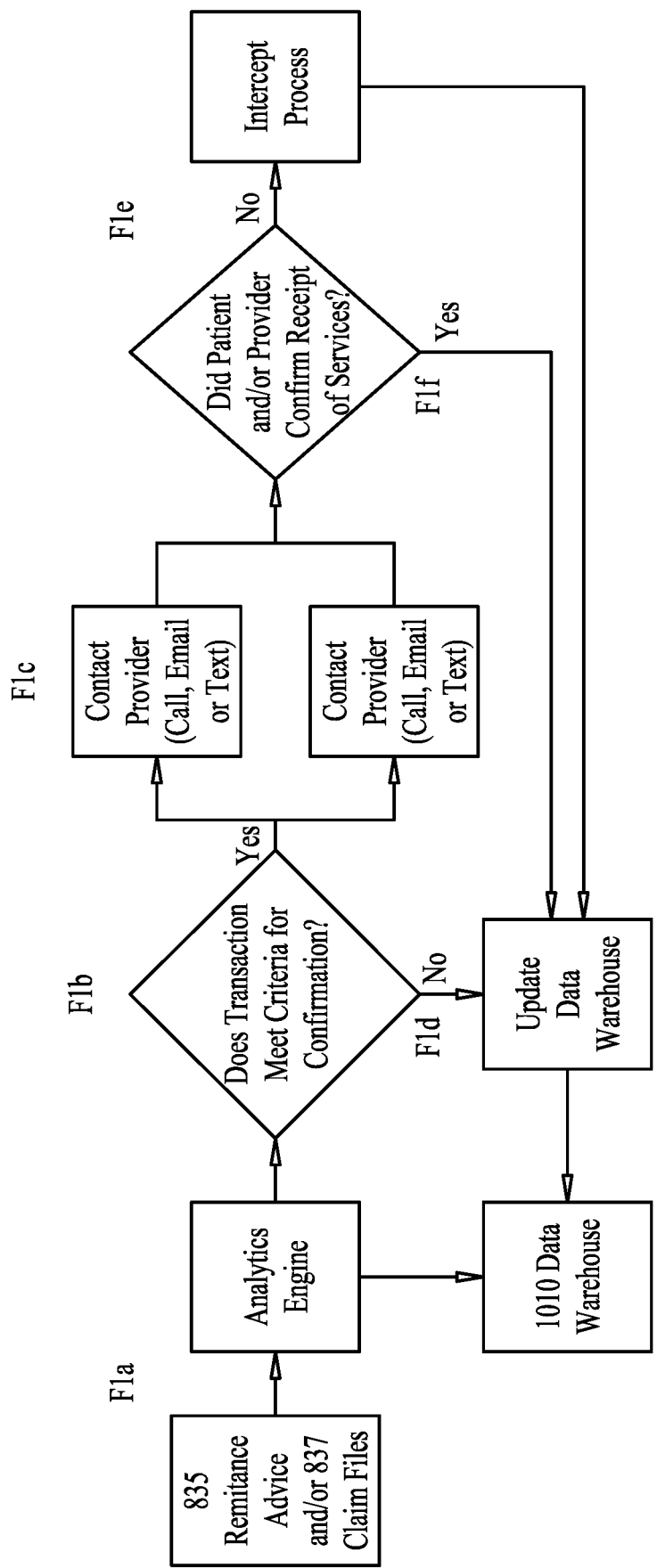
FIG. 1 is a flow diagram of the health care claim integrity system detection process in accordance with the present invention.

FIG. 1 shows a preferred workflow for importation, analysis, confirmation and intercept of potentially fraudulent health care claims in accordance with the present invention. At step F1a healthcare claim data from an 835 Remittance Advice, 837 Claim File or other HIPAA or non-HIPAA compliant electronic data format can be imported into the analytics engine. At step F1b, utilizing proprietary rules and technology, the analytics engine makes a determination as to whether a claim is suspected of potential fraud and/or abuse and to divert suspect claims identified by the analytics engine for confirmation.

At step F1c for claims meeting the criteria and requiring confirmation of services provided and/or products received, the health care provider and/or the patient is contacted preferably, though not limiting, through an automated system via phone, email and/or SMS messaging to confirm that services or products were provided or received. Other messaging systems can also be used, such as, but not limited to, instant messaging, Facebook messaging, etc. and all are considered within the scope of the invention. Depending on the specific circumstances, confirmation may be required by the health care provider only, by the patient only, or by both the health care provider and patient.

As seen in step F1d for claims not meeting the criteria and thus not requiring confirmation of services provided and/or products received, the claim record is updated in the electronic data warehouse to reflect such and that the claim was reviewed. As seen in step F1e for claims identified in F1b (meeting the criteria as potentially suspect or fraudulent and needing further review) where the patient or provider did not acknowledge the patient's receipt of services and/or products, the claims intercept process is initiated which could either prevent the claim from being paid to the provider without further review and/or serve as an additional data point along with other factors to identify suspect claims, providers, physicians and/or patients involved in schemes involving collusion among them.

As seen in step F1f for claims identified in F1b where the patient or provider provided a positive acknowledgement for the patient's receipt of services and/or products, the claim record is updated in the electronic data warehouse to reflect such and that claim has been reviewed. This data point is then considered by the analytics engine for future claims processed by it. The invention can specifically include, but is not limited to, "seeding" confirmation messages sent to different parties involved in the transaction. Seeding in this context means intentionally introducing requests for confirmation of services or products that were not in fact received from or provided by the provider. Responses to these "seeded" requests for confirmation are used by the analytics engine to determine if collusion is involved.

Figure 2:
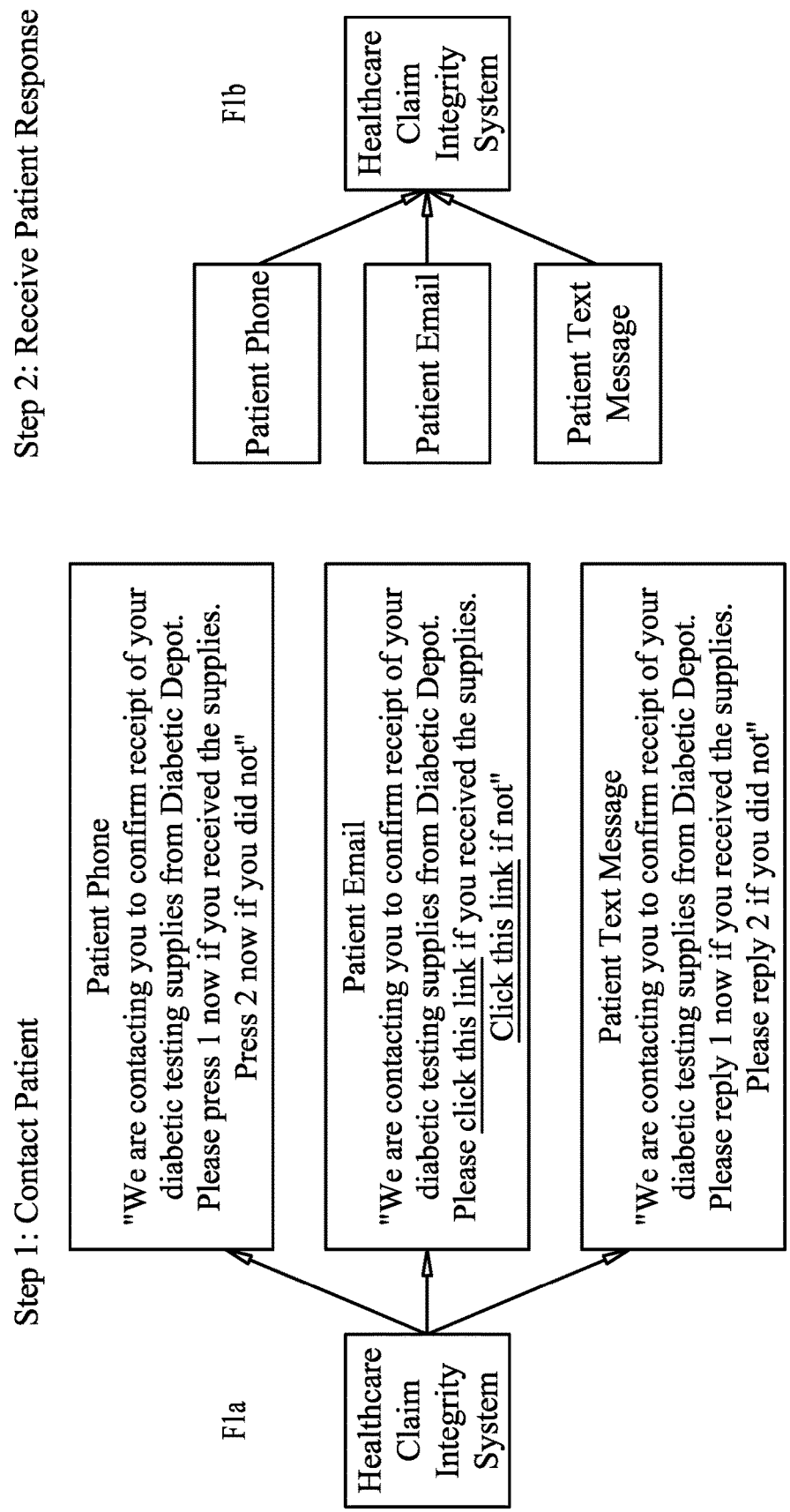
FIG. 2 is a flow diagram of the health care claim confirmation process in accordance with the present invention.

FIG. 2 shows the workflow for confirming the patient's receipt of services and/or products with the confirmation coming from a patient and/or physician and also illustrates where this workflow is performed in relationship to the various steps shown in FIG. 1 (which is also reproduced in smaller size in FIG. 2). In step F1a of FIG. 2 for claims meeting criteria and requiring confirmation of services and/or products, the health care claim integrity system contacts the provider and/or the patient preferably, though not limiting, through an automated system via phone (i.e. any type of phone—cellular phone, landline, satellite phone, etc.), email and/or SMS messaging to confirm that services and/or products were provided or received. Non-limiting examples of the type of message that can be sent to the provider and//or patient are illustrated. Other messages can also be sent and are considered within the scope of the invention.

At step F1b of FIG. 2 the patients and/or providers must either enter a specific character or click on the appropriate hyperlink to indicate their response. For a non-limiting example, the patient or provider may press the "1" button on his or her phone for a "yes" response or press the "2" button for a "no" response. Other configurations, messages, phrases and numbers can be used and all are considered within the scope of the invention. Responses are received by the health care claim integrity system and utilized to update claim records.

The health care claim integrity system and method described above can provide administrative, clinical and/or financial benefits to healthcare payers, providers and patients alike, including, but not limited to, the following public benefits:

1. Reduce the incident of health care fraud and abuse, resulting in significant cost savings to the payer, provider and patient.
2. Reduce manual effort involved in identification of potentially fraudulent and abusive charges
3. Reduce manual effort involved in the confirmation of receipt of medical services and supplies.
4. Lower administrative costs due to false claims
5. Minimize false medical data reported on a patient's health care record Any computer/server/electronic database system (collectively "Computer System") capable of being programmed with the specific steps of the present invention can be used and is considered within the scope of the invention. Once programmed such Computer System can preferably be considered a special purpose computer limited to the use of two or more of the above particularly described combination of steps (programmed instructions) performing two or more of the above particularly described combination of functions All amounts, component or part locations, configurations, values, percentages, materials, orientations, etc. discussed above or shown in the drawings, if any, are merely by way of example and are not considered limiting and other amounts, component or part locations, configurations, values, percentages, materials, orientations etc. can be chosen and used and all are considered within the scope of the invention.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

While the invention has been described and disclosed in certain terms and has disclosed certain embodiments or modifications, persons skilled in the art who have acquainted themselves with the invention, will appreciate that it is not necessarily limited by such terms, nor to the specific embodiments and modification disclosed herein. Thus, a wide variety of alternatives, suggested by the teachings herein, can be practiced without departing from the spirit of the invention, and rights to such alternatives are particularly reserved and considered within the scope of the invention.

What is claimed is:

1. A computer implemented method for automatically identifying potential collusion with respect to a healthcare claim after the healthcare claim has been electronically submitted for payment, said method comprising the steps of:
   (a) receiving healthcare claim data by an analytics engine of a computer;
   (b) determining by the analytics engine based on programmed rules whether or not a healthcare claim based on the received healthcare claim data is potentially suspect or fraudulent;

(c) diverting for confirmation any healthcare claim determined to be potentially suspect or fraudulent by the analytics engine based on programmed rules;

(d) contacting a healthcare provider or patient associated with the healthcare claim regarding whether one or more services listed in the healthcare claim were rendered by the healthcare provider or whether the patient received one or more products listed in the healthcare claim where the healthcare claim is diverted in step (c) or updating an electronic data warehouse that the healthcare claim was reviewed and does not require confirmation where the analytics engine determines in step (b) that the healthcare claim is not potentially suspect or fraudulent;

(e) when the healthcare claim is diverted in step (c) requesting confirmation of an electronic "seeded" request listing of one or more services being rendered or one or more products being received that are known by said analytical engine to not to have been provided or received; and (f) automatically updating the programmed detection criteria used by the analytics engine for future healthcare claims by the healthcare claim integrity computer system based on data points from the submitted healthcare claim.

2. The computer implemented method of claim 1 wherein said step (d) comprises automatically contacting the healthcare provider or patient through phone, email, SMS or instant messaging.

3. The computer implemented method of claim 1 further comprising the steps:

(g) receiving confirmation from the healthcare provider or patient that the one or more services were rendered or that the one or more products were received; and (h) updating an electronic data warehouse that the healthcare claim was reviewed and that confirmation was received from the healthcare provider or patient.

4. The computer implemented method of claim 1 further comprising the steps of:

(g) initiating a claim intercept process where no confirmation is received from the healthcare provider or patient that one or more services were rendered or that one or more products were received; and (h) updating an electronic data warehouse that the healthcare claim was reviewed, that no confirmation was received from the healthcare provider or patient and that a claim intercept was initiated.

5. A computer implemented method for automatically identifying potential collusion with respect to a healthcare claim after the healthcare claim has been electronically submitted for payment, said method comprising the steps of:

(a) electronically receiving a healthcare claim for payment from a healthcare provider by a healthcare claim integrity computer system of a healthcare payer where the healthcare claim identifies one or more services or one or more products provided to a patient by the healthcare provider, the healthcare claim integrity computer system including an analytics engine in electronic communication with an electronic data warehouse, the analytics engine programmed to determine the likelihood of potential fraud and abuse for a submitted healthcare claim and is programmed to consider data points from the submitted healthcare claim in future potential fraud and abuse determinations by the analytics engine;

(b) automatically creating an electronic "seeded" request by the analytics engine listing one or more services or products in the request that are not listed in the received submitted healthcare claim;

(c) electronically forwarding the "seeded" request by the healthcare claim integrity computer system to the healthcare provider or patient asking the healthcare provider or patient to confirm whether or not the one or more services or products in the request were provided to the patient by the healthcare provider; and (d) electronically and automatically identifying, by the healthcare claim integrity computer system, potential collusion when an indication is received by the healthcare claim integrity system from the healthcare provider or patient stating or representing that the one or more services or products in the "seeded" request were provided to the patient by the healthcare provider; and (e) automatically updating the programmed detection criteria used by the analytics engine for future healthcare claims by the healthcare claim integrity computer system based on data points from the submitted healthcare claim.

6. A computer implemented method for automatically identifying potential collusion with respect to a healthcare claim after the healthcare claim has been electronically submitted for payment, said method comprising the steps of:

(a) electronically receiving a healthcare claim for payment from a healthcare provider by a healthcare claim integrity computer system of a healthcare payer where the healthcare claim identifies one or more services or one or more products provided to a patient by the healthcare provider, the healthcare claim integrity computer system including an analytics engine in electronic communication with an electronic data warehouse, the analytics engine programmed to determine the likelihood of potential fraud and abuse for a submitted healthcare claim and is programmed to consider information concerning the submitted healthcare claim in future potential fraud and abuse determinations by the analytics engine;

(b) automatically creating an electronic "seeded" request by the analytics engine listing one or more services or products in the request that are not listed in the received submitted healthcare claim;

(c) electronically forwarding the "seeded" request by the healthcare claim integrity computer system to the healthcare provider or patient asking the healthcare provider or patient to confirm whether or not the one or more services or products in the request were provided to the patient by the healthcare provider;

(d) electronically and automatically identifying, by the healthcare claim integrity computer system, potential collusion when an indication is received by the healthcare claim integrity system from the healthcare provider or patient stating or representing that the one or more services or products in the "seeded" request were provided to the patient by the healthcare provider; and (e) automatically updating the programmed detection criteria used by the analytics engine for future healthcare claims by the healthcare claim integrity computer system based on data saved concerning confirmation of the submitted healthcare claim or an intercept of the submitted healthcare claim.

7. A computer implemented method for automatically identifying potential collusion with respect to a healthcare claim after the healthcare claim has been electronically submitted for payment, said method comprising the steps of:

(a) receiving healthcare claim data by an analytics engine of a computer;

(b) determining by the analytics engine based on programmed rules whether or not a healthcare claim based on the received healthcare claim data is potentially suspect or fraudulent;

(c) diverting for confirmation any healthcare claim determined to be potentially suspect or fraudulent by the analytics engine based on programmed rules;

(d) contacting a healthcare provider or patient associated with the healthcare claim regarding whether one or more services listed in the healthcare claim were rendered by the healthcare provider or whether the patient received one or more products listed in the healthcare claim where the healthcare claim is diverted in step (c) or updating an electronic data warehouse that the healthcare claim was reviewed and does not require confirmation where the analytics engine determines in step (b) that the healthcare claim is not potentially suspect or fraudulent;

(e) when the healthcare claim is diverted in step (c) requesting confirmation of an electronic "seeded" request listing of one or more services being rendered or one or more products being received that are known by said analytical engine to not to have been provided or received; and (f) automatically updating the programmed detection criteria used by the analytics engine for future healthcare claims by the healthcare claim integrity computer system based on data saved concerning confirmation of the submitted healthcare claim or an intercept of the submitted healthcare claim.

8. The computer implemented method of claim 7 wherein said step (d) comprises automatically contacting the healthcare provider or patient through phone, email, SMS or instant messaging.

9. The computer implemented method of claim 7 further comprising the steps:

(g) receiving confirmation from the healthcare provider or patient that the one or more services were rendered or that the one or more products were received; and (h) updating an electronic data warehouse that the healthcare claim was reviewed and that confirmation was received from the healthcare provider or patient.

10. The computer implemented method of claim 7 further comprising the steps of:

(g) initiating a claim intercept process where no confirmation is received from the healthcare provider or patient that one or more services were rendered or that one or more products were received; and (h) updating an electronic data warehouse that the healthcare claim was reviewed, that no confirmation was received from the healthcare provider or patient and that a claim intercept was initiated.

* * * * *